W. E. CRIST.
LUBRICATOR FOR JOURNAL BOXES.
APPLICATION FILED JUNE 27, 1919.
1,337,202.
Patented Apr. 20, 1920.
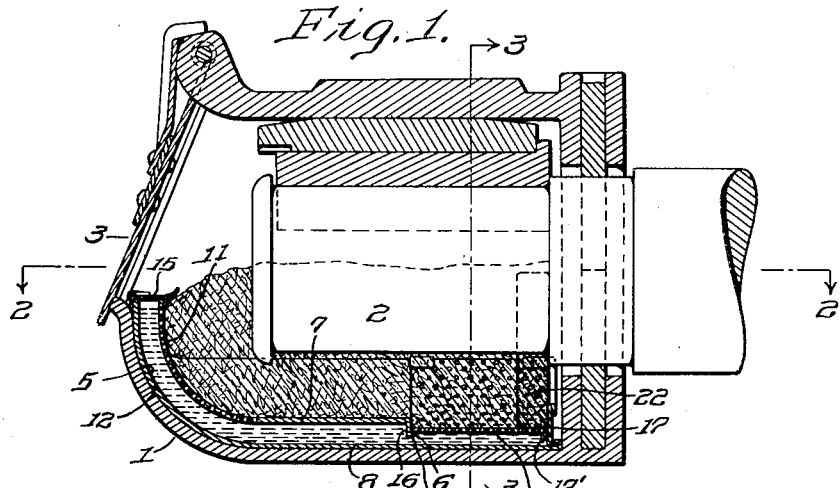
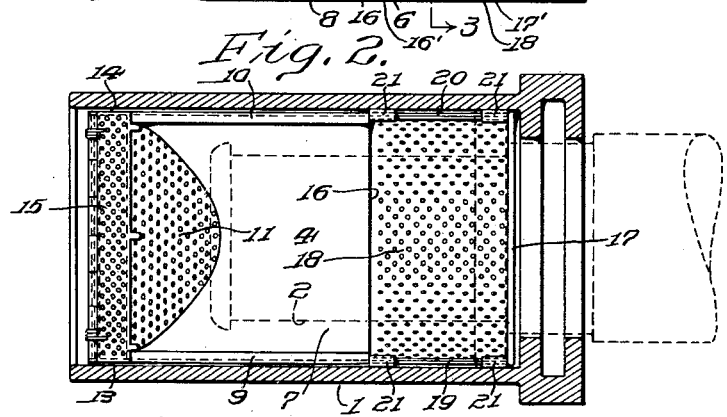
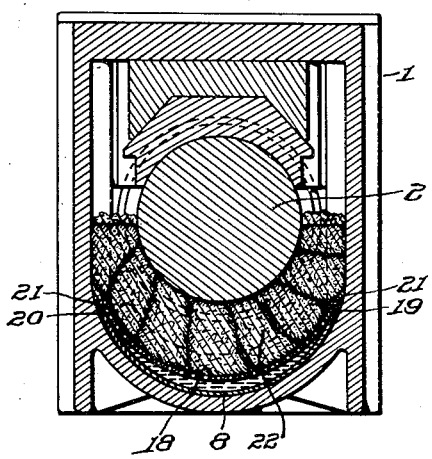
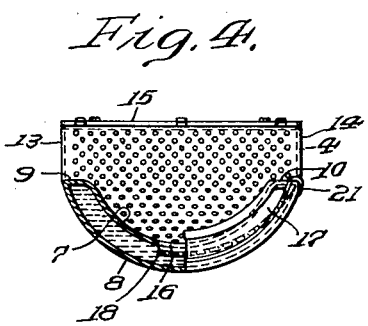
WITNESS
F. J. Hartman.
INVENTOR
William E. Crist.
BY
Brunt Moulton,
ATTORNEYS

UNITED STATES PATENT OFFICE.

WILLIAM E. CRIST, OF BALTIMORE, MARYLAND.

LUBRICATOR FOR JOURNAL-BOXES.

1,337,202.   Specification of Letters Patent.   Patented Apr. 20, 1920.

Application filed June 27, 1919. Serial No. 307,106.

*To all whom it may concern:*

Be it known that I, WILLIAM E. CRIST, a citizen of the United States, and a resident of the city of Baltimore and State of Maryland, have invented certain new and useful Improvements in Lubricators for Journal-Boxes, of which the following is a specification.

This invention relates to lubricating devices for journal boxes which may be bodily inserted in any of the standard forms of journal boxes, in present use, without, in any way, altering the same and comprehends the idea of maintaining a certain amount or bulk of lubricant, aside from what is already normally held by capillarity in the waste or packing, which may be fed to the packing or waste for continued effective and efficient supply of the lubricant to the parts of the bearing, particularly the parts that are more apt to be subjected to frictional heat.

Some of the objects of my invention, therefore, are to provide a means of simple construction which will more efficiently and equally distribute the lubricant than in devices heretofore utilized; to so distribute the lubricant as to supply the same to the parts requiring most; to provide a means whereby greater efficiency of lubrication and greater economy of the lubricant may be obtained; to so construct the device as to reduce to a practical minimum the frictional destructive effects that usually arise in journal boxes and to increase the life of the latter; to include at the filleted part of the journal or bearing a certain form of packing which will so coöperate with the feeding portion of the lubricating means as to effectively convey the lubricant to that part of the journal; to so construct the invention as to impart to the lubricant therein a motion or movement arising from the motion of the journal box or vehicle in aid of feeding said lubricant to the packing referred to above, as well as, to the packing usually used in journal boxes, and to reduce the cost in operation and maintenance, as well as, the cost of materials.

Other objects and advantages of this invention will be disclosed in the following specification.

In the accompanying drawing forming a part hereof:

Figure 1 is a vertical longitudinal section through the journal box and one form of lubricating device illustrating my invention;

Fig. 2 is a horizontal section through the journal box taken on the line 2, 2 of Fig. 1 and a top plan view of the contained lubricating device;

Fig. 3 is a transverse section of the journal box and of the lubricating device taken on line 3, 3 of Fig. 1, and, Fig. 4 is and end view of the lubricator with parts shown in section.

Referring now more particularly to the drawing wherein the same reference characters designate the corresponding parts throughout the several views, a journal box 1 of standard type is shown mounted upon a journal 2 and provided with the usual form of door 3. A lubricating device constituting the invention herein disclosed is bodily inserted within the lower compartment of the journal box and comprises a substantially closed lubricant container or channel member 4 which rests upon the bottom of the journal box 1 and is provided at one end with an upwardly curved portion or trough 5 and at the other end with an opening or mouth portion 6. This container is of a shape of a portion of a hollow cylinder with one end rounded or upwardly curved and comprises the upper and lower cylindric walls 7 and 8 arranged in spaced concentric relation with the upper edges thereof at both sides, connected to the ledges 9 and 10. At the forward end of this structure are provided the upwardly curved inner perforated wall 11 and the outer wall 12 each curving smoothly out of the respective walls 7 and 8 and also extending a short distance above the ledges 9 and 10, such extending portions being connected by the side walls 13 and 14. The upper edges of the walls 11, 12, 13 and 14 constitute a rectangular opening leading to the space inclosed by said walls. This opening may be normally covered by the hinged cover plate 15.

At the other end of the device the lower wall 8 extends beyond the end 16 of the upper wall 8 and is provided at its end with an arc shaped vertically disposed end wall 17. Between this end wall and the end 16 is located a curved perforated sheet metal member 18 with the upper edges thereof resting against the upper edges 19 and 20 of the extended portion of the lower wall and the ends thereof downwardly bent to respectively rest upon the flanges 16' and 17' of the end wall 17. The space between this perforated member 18 and the lower wall extended is in cross-section of a crescent shape. The extension of the lower wall 8 may be provided with clasping pieces 21, suitably secured to the extension at the edges thereof, which may be bent or folded over the edges of the perforated member 18, to maintain the same in position. The top surface of the perforated member may be, as shown, slightly below the surface, extended, of the upper wall 7.

The parts may be connected together by any appropriate means or in any suitable manner, as by soldering, brazing, beading or spinning or the like, my invention, however, not being limited to any particular method of uniting such parts.

It will be observed that the bottom wall 8 is rounded and of substantially cylindrical form for the purpose of fitting round bottom journal boxes, but it may be noted, however, that in the event that flat bottom or otherwise shaped journal boxes be used the shape of the bottom of the container may be so formed as to conform with the bottom surface of the particular journal box into which the container is intended to be used.

In practice the lubricator may be bodily inserted through the main opening of the journal box and located to rest upon the bottom wall of the journal box and beneath the journal. In the space provided between the filleted portion of the journal and the forward end of the perforated member 18 may be inserted a piece of special lubricating packing 22 of twisted formation adapted to absorb and transmit the lubricating oil from the container to such portion of the journal. The remainder of the space interposed between the bottom journal and the top of the lubricator is packed with the usual cotton waste packing or any other material that may be chosen in its place to convey the lubricating oil from the container, through the remainder of the perforated member 18, to the journal. The oil ordinarily is poured into the journal boxes upon the cotton waste and is adapted to flow through the perforations of the cover plate 15 and the wall 11 into the body of the container or lubricator between the upper wall 7 and the lower wall 8 and beneath the perforated member 18. At the latter point the oil contacts with the waste and the twisted packing and is absorbed and conveyed thereby to the journal and is distributed in an efficient manner thereon. In this way the space leading from the trough opening to the space beneath the perforated member 18 functions as a channel or conduit for the flow of the oil downwardly therethrough to the perforations in the member 18.

The perforations in the wall 11 the cover plate 15 and the member 18 also serve the purpose of straining the oil from extraneous matter.

The device may be made of any material such as metal suitable for the purposes disclosed and may possess such resiliency as may be required to properly and snugly fit in a standard type of journal box and yield to conform to whatever various conditions that may arise therein during the use of the journal box.

While I have shown one form of means embodying my invention I do not wish, however, to be limited to the particular details herein described and shown upon the drawing but the same is intended to comprehend such other devices as may come within the spirit of my invention and the scope of the appended claims.

Having thus described the nature and objects of my invention what I claim as new and desire to secure by Letters Patent is:

1. In lubricating devices for journal boxes, the combination of a closed lubricant container located in the lower part of the journal box, an inlet channel communicating with said container, an outlet feed channel communicating with and leading from said container to packing means located at an end of the bearing surface of the journal and perforated means at the outlet end of said feed channel for filtering the lubricant supplied to said journal.

2. In lubricating devices for journal boxes, the combination of a closed lubricant container located in the lower part of the journal box, the lower and upper walls of said container being curved and concentric, an upwardly extending channel like member provided at the inlet end of said container and an open extension at the other end of said container, said extension being perforated and adapted to support packing between the same and the journal, said inlet channel being located at a higher level than said outlet channel and filtering means for said inlet channel.

In witness whereof I hereunto set my hand this 18th day of June, 1919.

WILLIAM E. CRIST.